UNITED STATES PATENT OFFICE.

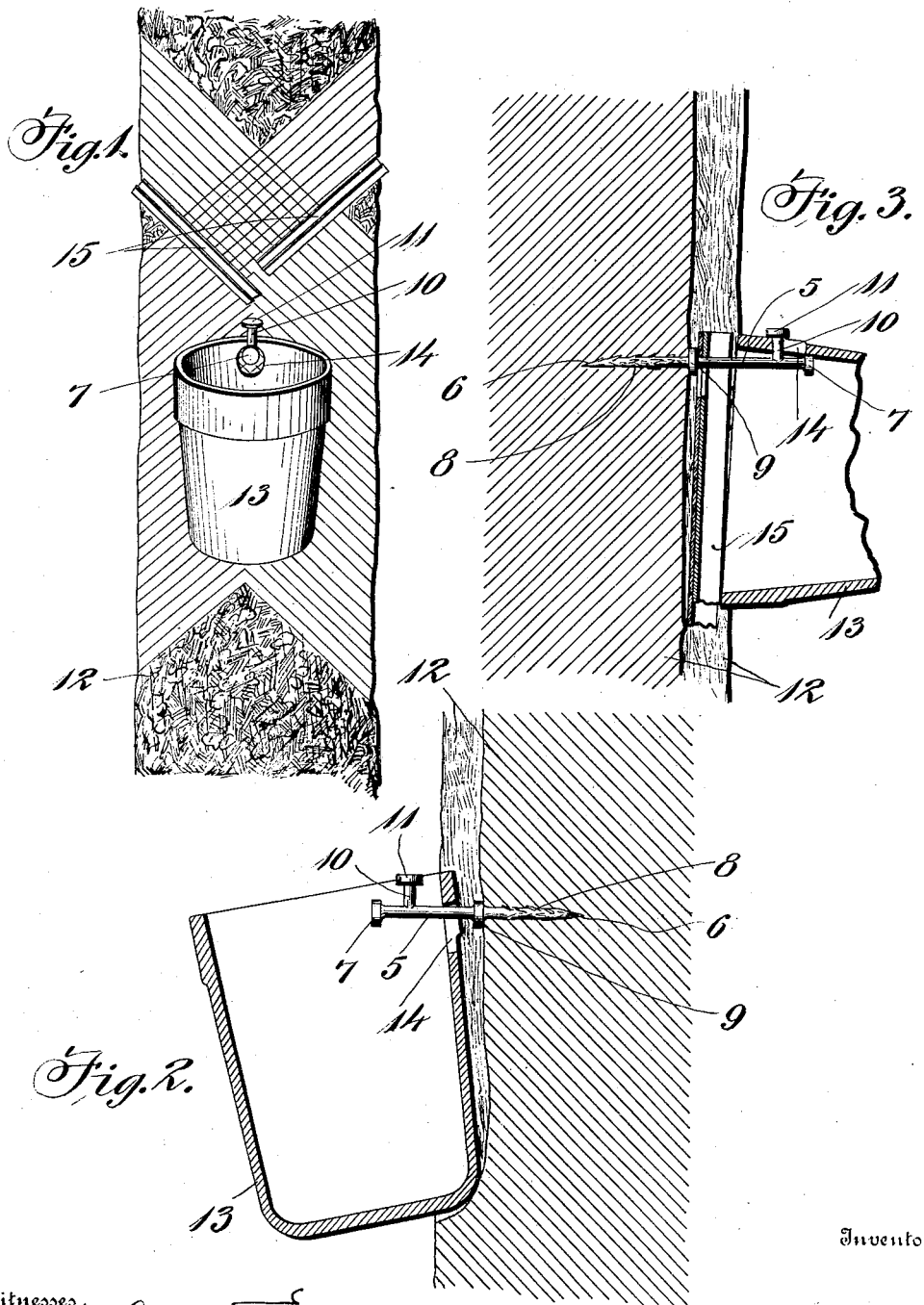

CHARLTON VARNADORE, OF KINARD, FLORIDA.

SAP-CUP SUPPORT.

No. 884,055.  Specification of Letters Patent.  Patented April 7, 1908.

Application filed February 1, 1908. Serial No. 413,787.

*To all whom it may concern:*

Be it known that I, CHARLTON VARNADORE, a citizen of the United States, residing at Kinard, in the county of Calhoun and State of Florida, have invented certain new and useful Improvements in Sap-Cup Supports, of which the following is a specification.

This invention is a support for a sap-cup or other receptacle used in gathering turpentine.

The invention comprises a spike-shaped device adapted to be driven into a tree, and having a form which enables it to support the cup in operative position as well as in such a position when not in use that water cannot enter thereinto.

In the accompanying drawing, Figure 1 is a perspective view showing the sap-cup supported by the device in position for use, and Fig. 2 is a vertical section thereof. Fig. 3 is a vertical section showing the position of the cup when not in use.

The device has the shape of a spike the shank of which is indicated at 5 in the drawing. At one end of the shank is a sharp driving point 6 and at the other end is a head 7. The shank, adjacent the driving point, is barbed as indicated at 8 to prevent easy withdrawal, and it also has a collar or shoulder 9 to limit the extent to which it may be driven into the tree. Adjacent the head 7, a short stem 10 projects laterally from the shank 5. This stem has a head 11.

In use, the device is driven into the tree 12 up to the collar 9 in such a position that the stem 10 will be upwardly presented. The head 7 enables the device to be readily driven into the tree by means of a hammer. The sap-cup 13 has a hole 14 whereby it is hung on the device with the shank 5 thereof passing through said hole, and the stem 10 inside the cup, as clearly shown in Fig. 2. If at the end of the season, it is desired to keep the sap-cup hanging on the tree, it is turned on its side and placed on the device in that position with the open end next to the tree, and the stem 10 passing through the hole 14 as shown in Fig. 3. When the sap-cup is in this position water cannot enter the same, and it will be fully protected from injury. The head 11 keeps the sap-cup from slipping off. The gutters 15 can also be hung up on the device between the cup and the tree, they being provided with holes for this purpose.

The device herein described affords convenient means for supporting the sap-cup during and after the season, and by reason of its simplicity of construction it can be cheaply produced.

I claim:—

A sap-cup support comprising a straight shank having at one end a driving point adapted to enter the tree, and a stem projecting laterally from the shank adjacent the other end thereof.

In testimony whereof I affix my signature, in presence of two witnesses.

CHARLTON VARNADORE.

Witnesses:
C. L. LAWOLS,
M. L. CHAFIN.